United States Patent
Pierce

(10) Patent No.: US 7,598,493 B2
(45) Date of Patent: Oct. 6, 2009

(54) METHOD OF IDENTIFYING PEAT MOSS

(76) Inventor: Michael J. Pierce, 6473 E. Lake Dr., Grand Forks, ND (US) 58201

( * ) Notice: Subject to any disclaimer, the term of this patent is extended or adjusted under 35 U.S.C. 154(b) by 498 days.

(21) Appl. No.: 11/441,889

(22) Filed: May 26, 2006

(65) Prior Publication Data

US 2006/0277821 A1   Dec. 14, 2006

Related U.S. Application Data

(60) Provisional application No. 60/684,649, filed on May 26, 2005.

(51) Int. Cl.
*G01J 5/02* (2006.01)
(52) U.S. Cl. .................................. 250/339.12
(58) Field of Classification Search ................
250/339.01–339.15
See application file for complete search history.

(56) References Cited

OTHER PUBLICATIONS

Yurkevich et al. "Investigation of MFTIR infrared spectra of peat waxes with sorbed cationic surfactants", 1990, Plenum Publishing Corporation, translated from Zhurnal Prikladnoi Spektroskopii, vol. 51, No. 6, pp. 956-961, Dec. 1989.*

* cited by examiner

*Primary Examiner*—David P Porta
*Assistant Examiner*—Kiho Kim
(74) *Attorney, Agent, or Firm*—Robert E. Kleve

(57) ABSTRACT

A method of identifying different brands of peat moss including the steps of separation of the peat and sand by first adding water to the peat and sand mixture to enable the peat to float to the top of the water and the sand to gravitate to the bottom collecting the peat at the surface of the water and drying the peat there after grinding the peat to pass thru a sieve of small mesh then mixing the ground peat with Potassium Bromide (KBr) at a ratio in the neighborhood of 1:20 then grinding said mixture with a mortar and pestle then loading to a sample cell; then loading a ground pure KBr to a reference cell, then scanning and collecting wave spectrums of the references and samples in the range of 4000 to 600 $cm^{-1}$, collect said spectrums directly from said peat/sand mixtures and dry said peat/sand mixtures in the neighborhood of 105 degrees centigrade for a 24 hour period.

2 Claims, 1 Drawing Sheet

METHOD OF IDENTIFYING PEAT MOSS

Figure 1:
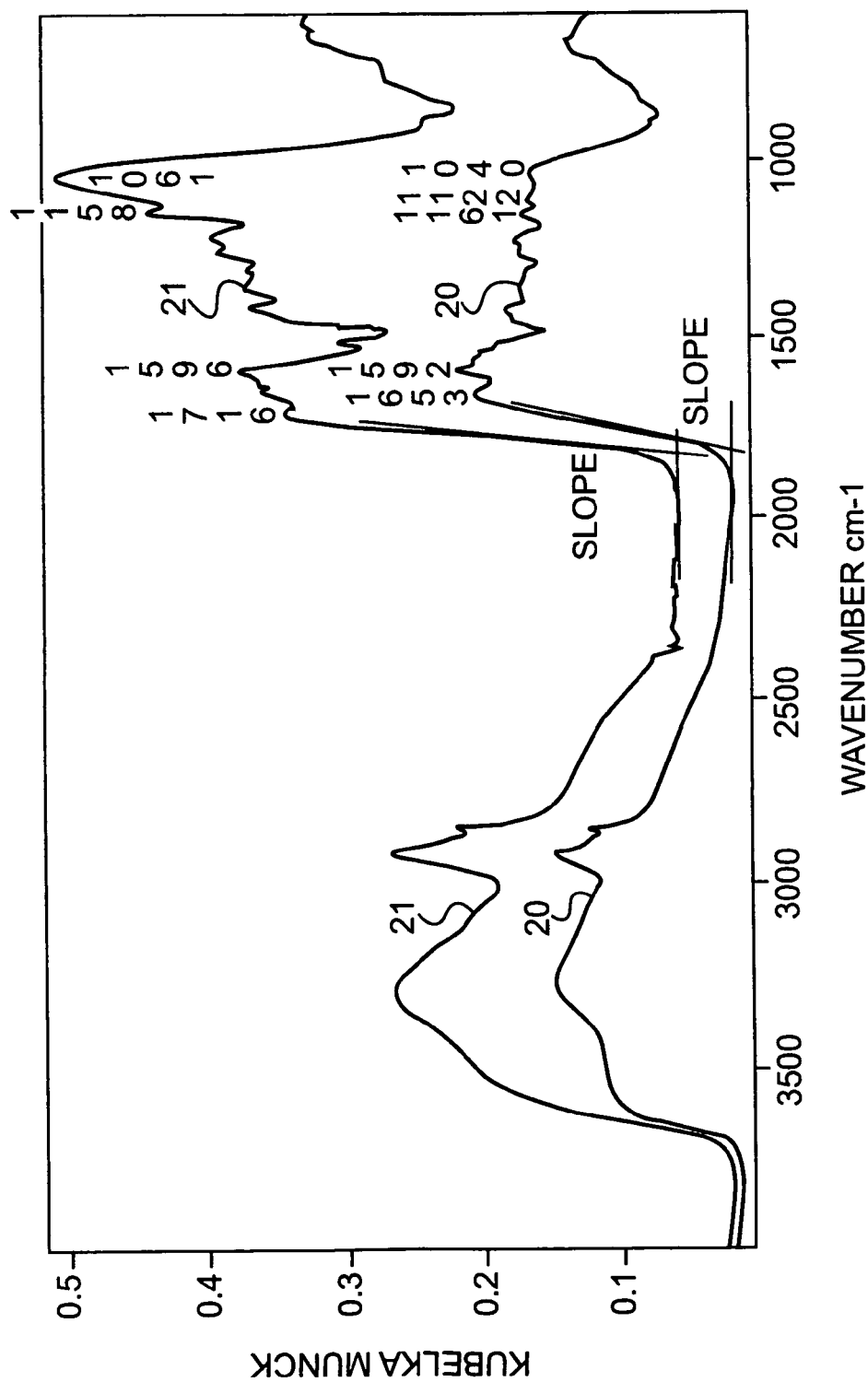

This invention relates to peat moss particularly to my provisional patent application Ser. No. 60/684,649 filing date May 26, 2005, priority of which is claimed. Particularly this invention relates to a method of determining one type or brand of peat moss from another.

It is an object of the invention to provide a method similar to DNA to identify different brands of peat moss to distinguish whether or not the purchaser has acquired the intended brand of peat moss or has been given a substitute.

It is another object of the invention to identify different brands of commercial peat moss by their DNA to prevent an unwanted brand being substituted by the seller. Further objects and advantages of the invention will become apparent as the description proceeds and when taken in conjunction with the accompanying drawing. Wherein:

FIG. 1 of the attached drawing is an illustration of the scan of two different types of peat moss. One type of peat moss is typically illustrated by the wave pattern indicated by the numeral 20 in the drawing. Another type of pet moss is typically illustrated by the wave pattern indicated by the numeral 21. The differences between wave pattern 20 and 21 in such things as the existence of peaks at different locations, different slopes, and different ratios in one wave pattern 20 versus the other wave pattern 21 act to identify that the two types of peat moss scanned are in fact different.

It has been found that different brands of peat moss sold commercially differ from other types or brands of peat moss; and that it is desirable to determine one type of brand of moss from another to prevent counterfeiting, substituting one brand as that of another without the purchasers knowledge.

Further, this involves a process similar to DNA to identify a particular brand of peat moss. The moss being tested may already be distributed onto a golf course, and by this method, it can be determined whether the moss on the course is entirely of a particular brand or has been mixed with another brand.

This method can be used to fingerprint or identify different peat materials from straight peat or pure peat and peat and sand mixtures.

1. Separation of peat and sand
   a. Buoyant Method: Add distilled water to peat/sand mixture and stir until the peat floats to the top and the sand at the bottom looks clear. Let the suspension settle for 5 minutes at room temperature (in case of clay existing, then settle for 5 hours), then collect the top 5 cm of supernatant containing the peat material into another container without disturbing the sediment. Dry the peat supernatant at 105 degrees C. Grind the peat to pass 270 mesh (53 microns or the like) sieves for further test.
   b. Shaking method: Dry the peat/sand mixture at 68 degrees C. for 24 hours. Transfer the mixture to a collecting pan of a sieve set and keep the amount of mixture less than 2 dm deep. Cover the pan with a lid and put the pan on a sieve shaker to shake for 2 minutes. Transfer the peat at the top of the mixture without collecting the sand. Grind the peat to pass 270 mesh (53 microns or the like) sieves for further test.

2. Preparation of peat sample for test
   a. Divide original sample to small amount of test sample. Dry at 105 degrees C. for 24 hours. Grand the peat to pass 270 mesh (53 microns or the like) sieves for further test.
   b. Store the grinded samples in a desiccator with drying agent if test is not conducted immediately.

3. Collect peat spectrum in near infrared region
   a. Mix the dry and grinded peat sample with dry Potassium Bromide (KBr) at a ratio of 1:20 weight basis. Grind the mixture with an agate mortar pestle.
   b. Load the grinded peat/KBr sample to a sample cell, and load grinded pure (KBr) to a reference cell. Scan and collect spectrums of a references and samples in the range of 4000 to 600 $Cm^{-1}$. Store the spectrums for data processing and analysis.

4. Collect peat spectrum directly from peat/sand mixtures.
   a. Dry peat/sand mixture at 105 degrees C. for 24 hours. Grind the mixture to pass 270 mesh (53 microns or the like) sieves. Mix grinded peat/sand sample with dry Potassium Bromide (KBr) to make peat content about 0.5 percent by weight in mixture.
   b. Dry the same sand that is in the peat/sand mixture at 105 degrees C. for 24 hours. Grind the sand to pass 270 mesh (53 microns or the like) sieves. Mix grinded sand with dry Potassium Bromide (KBr) at a ratio of 1:20 on weight basis. Grind the mixture with an agate mortar pestle.
   c. Load the grinded peat/KBr sample to a sample cell, and load grinded pure KBr to a reference cell. Scan and collect spectrums of references and samples in the range of 4000 to 600 $cm^{-1}$. Store the spectrums for data processing and analysis.
   d. Load the grinded sand/KBR sample to sample cell, and load grinded pure KBr to a reference cell. Scan and collect spectrums of references and samples in the range of 4000 to 600 $cm^{-1}$. Store the spectrums for data processing and analysis.
   e. Subtract the spectrum o sand from the spectrum of peat/sand mixtures mathematically to obtain peat spectrum.

5. Peat FT-IR spectra identification (FIG. 1).
   a. The existence or absence of peak at 1720±5 $cm^{-1}$.
   b. The existence or absence of peak at 1652±5 $cm^{-1}$.
   c. The existence of absence of peak at 1120±5 $cm^{-1}$.
   d. The slope of peak 1720±5 $cm^{-1}$ (if peak at 172±5 $cm^{-1}$ is absent) is used as a parameter of peat decomposing. Higher ratio indicates more decomposition.
   f. All information from 5a to 5e is used to identify a peat source.

It will be obvious that various changes and departures may be made to the invention without departing from its spirit and scope thereof and accordingly it is not intended that the invention be limited to that specifically described in the specification or as illustrated in the drawing but only as set forth in the appended claims wherein.

What is claimed is:

1. A method of identifying different brands of peat moss including the steps of separation of the peat and sand by first adding water to the peat and sand mixture to enable the peat to float to the top of the water and the sand to gravitate to the bottom collecting the peat at the surface of the water and drying the peat there after grinding the peat to pass thru a sieve of small mesh then mixing the ground peat with Potassium Bromide (KBr) at a ratio in the neighborhood of 1:20 then grinding said mixture with a mortar and pestle then loading to a sample cell; then loading a ground pure KBr to a reference cell, then scanning and collecting wave spectrums of the references and samples in the range of 4000 to 600 $cm^{-1}$, collect said spectrums directly from said peat/sand mixtures and dry said peat/sand mixtures in the neighborhood of 105 degrees Celsius for a 24 hour period.

2. A method according to claim 1 which includes the further steps to subtract the spectrum of sand from the spectrum of peat/sand mixture mathematically to obtain peat spectrum, graphically identify the location of the peaks of the sand and the peat/sand mixtures to determine the existence of absence of a peak at 1720±5 cm$^{-1}$ as between the sand spectrum and the peat/sand spectrum, graphically identify the location of the peaks of the sand and the peat/sand mixtures to determine the existence of absence of a peak at 1652±45 cm$^{-1}$ as between the sand spectrum and the peat/sand spectrum, graphically identify the location of the peaks of the sand and the peat/sand mixtures to determine the existence of absence of a peak at 1120±5 cm$^{-1}$ as between the sand spectrum and the peat/sand spectrum whereby if the slope of the peak 1720±5 cm$^{-1}$ is used whereby the slope or lack of slope of the sand spectrum versus the peat/sand spectrum and the differences between the two can be used to identify whether two different samples of peat moss are in fact different or virtually similar.

* * * * *